United States Patent
Poon et al.

(10) Patent No.: US 7,772,290 B2
(45) Date of Patent: Aug. 10, 2010

(54) METHOD TO PREPARE A NANOSIZED-STRUCTURE FILM OF MULTI-PHOBIC EFFECTS AND ITS APPLICATION

(76) Inventors: Ho Cheong Poon, Flat U, 7/F., Blk. 3, Camel Paint Building, 60 Hoi Yuen Road, Kwun Tong, Kowloon (HK); Jing Chun Liu, Flat U, 7/F., Blk. 3, Camel Paint Building, 60 Hoi Yuen Road, Kwun Tong, Kowloon (HK); Fugao Chen, Flat U, 7/F., Blk. 3, Camel Paint Building, 60 Hoi Yuen Road, Kwun Tong, Kowloon (HK)

( * ) Notice: Subject to any disclaimer, the term of this patent is extended or adjusted under 35 U.S.C. 154(b) by 1187 days.

(21) Appl. No.: 11/298,911

(22) Filed: Dec. 9, 2005

(65) Prior Publication Data

US 2006/0235145 A1 Oct. 19, 2006

(30) Foreign Application Priority Data

Mar. 21, 2005 (CN) .................. 2005 1 0042570

(51) Int. Cl.
C09K 21/00 (2006.01)
C04B 14/04 (2006.01)

(52) U.S. Cl. .................. 516/100; 106/483; 106/490; 106/491

(58) Field of Classification Search .............. 106/490, 106/483, 491; 516/100; 526/243, 245
See application file for complete search history.

(56) References Cited

U.S. PATENT DOCUMENTS

| | | | |
|---|---|---|---|
| RE28,914 E | 7/1976 | Marco | |
| 4,029,867 A | 6/1977 | Wasley et al. | |
| 4,032,495 A | 6/1977 | Perronin et al. | |
| 4,043,965 A | 8/1977 | Dickson | |
| 4,314,805 A | 2/1982 | McKnight | |
| 4,820,307 A | 4/1989 | Welch et al. | |
| 5,221,285 A | 6/1993 | Andrews et al. | |
| 5,362,847 A | 11/1994 | Miller et al. | |
| 5,516,578 A | 5/1996 | Coppens | |
| 5,534,604 A | 7/1996 | Bildhauer et al. | |
| 5,543,214 A | 8/1996 | Groshens et al. | |
| 5,594,125 A | 1/1997 | Seyschab et al. | |
| 5,707,708 A | 1/1998 | Pechhold | |
| 5,725,789 A | 3/1998 | Huber et al. | |
| 5,834,088 A | 11/1998 | Pechhold | |
| 5,876,617 A | 3/1999 | Sato et al. | |
| 6,379,753 B1 | 4/2002 | Soane et al. | |
| 6,472,476 B1 | 10/2002 | Soane et al. | |
| 6,485,530 B1 | 11/2002 | Soane et al. | |
| 6,544,594 B2 | 4/2003 | Linford et al. | |
| 6,599,327 B2 | 7/2003 | Soane et al. | |
| 6,607,564 B2 | 8/2003 | Soane et al. | |
| 6,607,994 B2 | 8/2003 | Soane et al. | |
| 6,617,267 B2 | 9/2003 | Soane et al. | |
| 6,855,772 B2 | 2/2005 | Linford et al. | |
| 6,872,424 B2 | 3/2005 | Linford et al. | |
| 2006/0251687 A1* | 11/2006 | Lapidot et al. | .............. 424/401 |

FOREIGN PATENT DOCUMENTS

| | | |
|---|---|---|
| CA | 2182146 A1 | 1/1997 |
| DE | 38 18 391 A1 | 12/1988 |
| DE | 40 35 378 A1 | 5/1992 |
| DE | 195 20 989 A1 | 12/1996 |
| EP | 0 300 370 A2 | 1/1989 |
| EP | 0 508 136 A2 | 10/1992 |
| EP | 0 648 890 A1 | 4/1995 |
| EP | 0 756 033 A2 | 1/1997 |
| EP | 0 294 648 A2 | 12/1998 |
| GB | 809745 | 3/1959 |
| JP | 11319709 * | 5/1998 |
| WO | WO 92/10605 A1 | 6/1992 |
| WO | WO 92/12286 A1 | 7/1992 |
| WO | WO 92/15748 A1 | 9/1992 |
| WO | WO 92/17636 A1 | 10/1992 |
| WO | WO 92/19680 A1 | 11/1992 |
| WO | WO 97/11218 A1 | 3/1997 |
| WO | WO 98/00500 A1 | 1/1998 |

\* cited by examiner

*Primary Examiner*—Stanley Silverman
*Assistant Examiner*—James A Fiorito
(74) *Attorney, Agent, or Firm*—Seed IP Law Group PLLC

(57) ABSTRACT

A method to prepare multi-phobic effects nanosized-structure film and its application are described, which features nanosized silica, titanium oxide and zinc oxide compounded materials of previous size 3-100 nm are in-situ combined with substrate through fluorocarbon surfactants and perfluoro alkyl filming substance under specific conditions to form a nanosized-structure film. The reaction between fluorocarbon surfactants and hydroxyl groups on surfaces of nanosized particles renders the modified nanosized particle and nanosized film having extremely high chemical stability, resistance, and the capacity to repel and disperse water, oil, bacteria, organic dust, gas, electricity, magnetism and light (i.e., multi-phobic effects). This technology may be widely used in surface modification of fabric, chemical fiber, cotton, wool, glass product, brick-stone concrete and wood wall.

3 Claims, 1 Drawing Sheet

METHOD TO PREPARE A NANOSIZED-STRUCTURE FILM OF MULTI-PHOBIC EFFECTS AND ITS APPLICATION

BACKGROUND OF THE INVENTION

1. Field of the Invention

This disclosure generally involves a method to prepare a nanosized-structure film and its application, especially the method to prepare a nanosized-structure film of multi-phobic effects and its application.

2. Description of the Related Art

Currently, there are many varieties and preparation methods of nanosized film materials and the preparation methods include colloid suspension chemical deposit method, self-assembly method, surface improvement method and electrochemical deposit method and with these methods many types of nanosized-structure functional films are prepared, such as nanosized-semiconductor film, nanosized porous film, nanosized optic film, nanosized magnetic film and nanosized tribological film. With the available technology, nanosized structure film is generally prepared from particles and liner. From the above functions of nanosized-structure films, yet no nanosized-structure film of multi-phobic effects and its preparation methods are claimed. This type of film utilizes the phobic effects to make any substances contacting a substrate (liner) to be fast released or dispersed from the substrate and thus prevent them from adhering to the substrate.

There are many decomposing, hydrophobic and oleophobic materials (i.e., the concept of single-phobic and dual-phobic), and their products are hydrophobic and oleophobic and thus they are water-proof and oil-proof. In the available technology the action merely repels water or oil is called single-phobic and the action repels both water and oil called dual-phobic. We define these materials as phobic-effect materials.

Currently, the phobic-effect materials generally consist of many chemical materials, which combine with the substrate through chemical reaction or chemical bonds and thus change the chemical and physical properties of the substrate. The representative phobic-effect materials include Teflon, N-(t-butyl) acryamide, ethyl-tetradecyl acrylate, vinyl laurate, halogen-bearing monomer, and N-fluoro styrene. Another way to render the substrate water-proof and oil-proof is to add wrapping materials of hydrophobic or oleophobic group (functional group) to the substrate, which are generally superfine powder or liquid. However, the available technology tend to have the following demerits:

I. The available nanosized-structure films have no multi-phobic effects and they are generally optic film, magnetic film, semiconductor film, conducting film and tribological film.

II. The "phobic-effects" materials in the available technology have merely a single function of water-proof, oil-proof, bacteria-proof, or electromagnetic-proof and they are generally not phobic to several substances.

III. The chemical compositions of the available technology mainly consist of organic substances or wrapping material. The materials have unstable performances and poor durability, and some of them even contain contaminating components and fail to meet ecological requirements.

IV. In the available technology of the single-phobic materials, some powdered materials are used. However, because of their relatively large particle size (generally above 1000 nm) they are not easy to disperse in liquid to form a colloid. When added to the medium, they merely generate unobvious effects and even impair product's luster. In addition, the functional groups on the powder are absorbed onto the powder surface through physical means, therefore, the bonds between the functional groups and the powder are not strong and will be weakened with lapse of time and increase in temperature, thus impairing the functions of the materials and products.

BRIEF SUMMARY OF THE INVENTION

In certain embodiments, a nanosized-structure film material of multi-phobic effects and its application are described. This material keeps the performances of both the substrate and product stable and has multi-functions of being hydrophobic, oleophobic, dust-proof, bacteria-proof and aging-proof.

More specifically, a new type of film and concept of function are proposed, i.e., nanosized structure "multi-phobic effects" film and its preparation. As used herein, the term "multi-phobic effects" means that functionally the nanosized film is able to catalyze, decompose, repel and disperse 3 or more substances, including water, oil, organic foreign matter, inorganic dust, bacteria, light, electricity and magnetism. On the other hand, the single-phobic or dual-phobic materials in the background technology belong to "element-phobic material".

A new method to prepare nanosized-structure film and its application are also described herein, in which the primary nanosized particle and filming substance are combined with the substrate under given conditions to form stable nanosized-structure compounded film.

BRIEF DESCRIPTION OF THE SEVERAL VIEWS OF THE DRAWING

In the drawings, the sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawing.

DETAILED DESCRIPTION OF THE INVENTION

Figure 1:
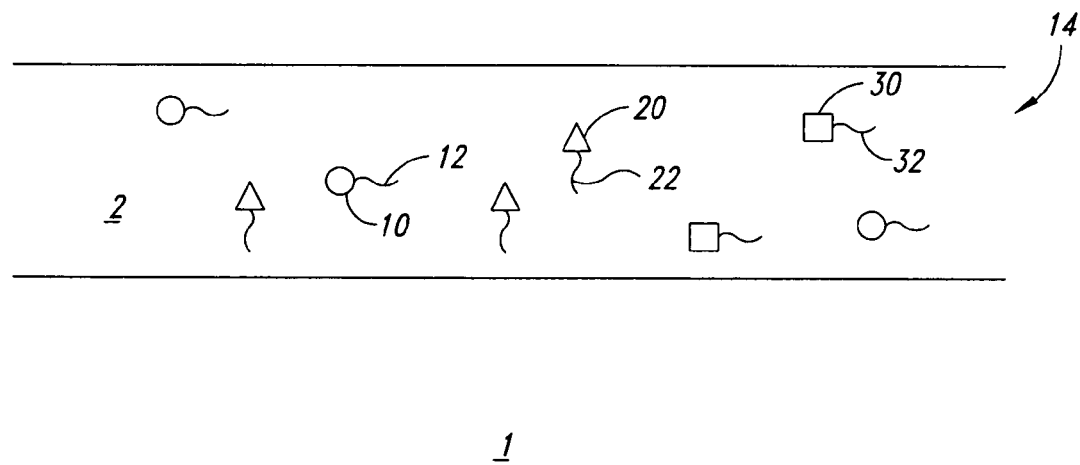
FIG. 1 is a schematic diagram of an embodiment illustrating a substrate coated with a nanosized film of multi-phobic effects.

As noted above, a method to prepare multi-phobic effects nanosized-structure film and its application are described herein. It features nanosized material comprising: nanosized bacteria-proof material, nanosized catalysts, nanosized interfacial material, nanosized surface energy-consuming materials and nanosized decomposing materials. The particle size of above materials is below 100 nm, and the above nanosized materials are modified with fluorocarbon surfactants and kept continuous with fluorocarbon filming substances. The thickness of the film is below 500 nm and the film structure may be divided into discontinuous phase and continuous phase.

In the embodiment illustrated in FIG. 1, a plurality of three types of nanosized particles 10, 20 and 30, also referred herein as "nanoparticles", are randomly distributed in a filming substance 2 to form a nanosized film 4. The nanosized film 4 is coated or otherwise integrated on a substrate 1 through penetration, absorption and chemical bonds. More specifically, nanoparticles 10, 20 and 30 represent at least three types of materials and collectively provide multi-phobic effects. Each type of the nanoparticles 10, 20 and 30 is surfaced modified by at least one of a corresponding type of fluorocarbon surfactant, 12, 22 and 32, respectively.

In particular, a method to prepare multi-phobic effects nanosized-structure film and its application are described as follows:

I. Selection of Raw Materials:

(I) Selection of Nanosized Materials:

a. Nanosized bacteria-proof material: silica carrier-based ($SiO_{2-x}$) metal ion bacteria-proof material, at proportion of 8%-12%. Brand: $SS_1$, $DS_1$ and $SP_1$.

b. Nanosized catalysts: nanosized titanium oxide ($TiO_2$). Brand: $DJ_3$, $DJ_{3-S}$.

c. Nanosized decomposing material: zinc oxide (ZnO). Brand: MN6Z.

d. Nanosized interfacial material: Alumina ($AlO_3$). Brand: NR-3Al.

e. Nanosized surface energy-consuming material: ($TiO_2$). Brand: RX-05.

(II) Selection of Modifying Aids:

Nanosized material modifying aids may be selected from different types of fluorocarbon surfactants depending on type of the above-mentioned nanosized materials, including:

Nanosized bacteria-proof material: tetrafluoro-isophthalonitrile surfactant.

Nanosized catalysts: fluorocarbon silane surfactant.

Nanosized decomposing material: perfluoro fluoro-silicone polymeric surfactant.

Nanosized interfacial material and surface energy-consuming material: 5% fluoroalkyl surfactant.

(III) Selection of Filming Substance:

The filming substance may be selected from fluorocarbon filming active material. An example of a filming substance includes, but is not limited to: perfluoro alkyl sulfuryl alkyl acrylate.

(IV) Selection of Dispersing Media of Nanosized Material:

The dispersing medium for modifying nanosized material may be an aromatic hydrocarbon. Typically, aliphatics-substituted aromatics, or their derivatives, for example, toluene and xylene are used as dispersing medium.

In preparation of dispersing medium for nanosized-structure film, on the other hand, deionized water is used.

II. Preparation Methods:

(I) Process for Modifying Nanosized Material:

The nanosized material used can be modified as follows: Disperse the above-mentioned nanosized powdered materials in dispersing medium xylene, add fluorocarbon surfactants to the dispersing medium at proportion of nanosized material: fluorocarbon surfactants ranging from about 1:0.005-1: 0.01 to make hydroxyl groups on surface of nanosized material completely react with fluorocarbon surfactants, remove dispersing medium, and obtain nanosized modified powdered materials through drying.

(II) Process of Preparation of Nanosized Compounded Material:

1. Compounding proportion for nanosized compounded powder: Thoroughly mix the above-mentioned nanosized materials in an agitator at proportion of:

a:b:c:d:e=20-30%:15-25%:20-30%:15-25%:15-20%

(III) Preparation of Nanosized Filming Paste:

1. Selection of Raw Materials f. Nanosized material: the above-mentioned nanosized modified compounded material, 0.1-2%.

g. Fluorocarbon filming substance: perfluoro alkyl sulfuryl alkyl acrylate 2-4%.

h. Functional aid: polyoxyethylennated alcohol, 0.05%-0.1%.

i. Dispersing medium: deionized water, 85-95%.

In one embodiment, the compounding proportion is:

f:g:h:i=2%:4%:0.1%:93.9%

2. Process of Preparation of Filming Paste:

Prepare raw materials at the above-mentioned proportion, add functional aid to dispersing medium (deionized water) at 50-70° C. and constant agitation to make the functional aid evenly dissolved in dispersing medium, slowly add the modified nanosized compounded material to the above solution under agitation at 120-160 rpm for 20-30 minutes, make indirect dispersion with emulsifying machine for 10-20 minutes to make nanosized material evenly dispersed in the liquid phase, slowly add fluorocarbon filming substance to the dispersed nanosized liquid phase and slowly and evenly mix the solution.

(IV) Process of Preparation of Nanosized-structure Film:

Thoroughly clean the substrate to be filmed, apply the filming paste onto the substrate through spray or dipping, dry the pasted substrate at 120-180° C. for 0.5-1 minute and control the thickness of nanosized-structure film through adjusting paste concentration, production link or filming-pressure.

Advantageously, the nanosized film prepared with the above-mentioned technical scheme has different functions, filming process, used materials and microstructure, and offers the following merits:

I. The nanosized-structure film in this disclosure is in-situ combined with the substrate and is inseparable from the substrate.

II. The nanosized material used for the nanosized-structure film is a multi-functional compounded material and through surface modifying, the film is able to repel and disperse water, oil, organic foreign matter, inorganic dust, bacteria, light, electricity and magnetism and overcome the demerits of single-phobic or dual-phobic materials in the existing technology.

III. The modifying aids for nanosized materials are mainly fluorocarbon surfactants, and a slight addition will remarkably reduce surface tension of a liquid (e.g., lower that of water from 73 mn/m to 8 mn/m).

IV. Due to the unique geometric dimension and electric negativity of fluorine atom, the modified nanosized material is highly thermal-stable, and highly resistant to very strong acid, alkali and oxidant.

V. Finally, fluorocarbon is used as the filming material to remarkably reduce film thickness, keep the chemical and physical properties and color of the original substrate, and greatly improve transparency and permeability.

From the above analysis, the multi-phobic effect nanosized-structure film prepared according to the method described herein eliminates the demerits of the background technology.

The following non-limiting examples describe specific processes and compositions for preparing films of multi-phobic effects.

EXAMPLE 1

Modified Nanosized Material

Add 30 g fluorocarbon surfactants (trade name: FN-80) to 200 ml toluene solvent, after complete dissolution, slowly add 200 g nanosized silica powder into above surfactant-containing solvent, then thoroughly mix the solution to make them completely react, remove toluene, dry the reaction product in oven at 120° C. and finally disperse the dried product with air-flow crusher to obtain white powdered nanosized modified material.

EXAMPLE 2

Add 100 g nanosized titanium oxide to 800 mL xylene, evenly mix them at room temperature, slowly add 8 g fluorocarbon surfactant to the mixed solution, under ultrasonic dispersion while adding, after addition continue ultrasonic agitation for 10 minutes to make them completely react, remove xylene from the solution to obtain the reaction product of titanium oxide and fluorocarbon surfactant, dry the reaction product in oven under 150° C., and finally disperse the dried product with air-flow crusher to obtain white powdered modified nanosized titanium oxide.

With the above method other modified powdered nanosized materials can be obtained such as modified nanosized zinc oxide and nanosized alumina.

EXAMPLE 3

Preparation of Nanosized Compounded Powder

Compound nanosized modified powders prepared in example 1 and 2 at the following proportion:
1. Selection of Raw Materials:
  a. Nanosized bacteria-proof material: silica of size 30 nm;
  b. Nanosized catalysts: titanium oxide of size 20 nm;
  c. Nanosized decomposing material: zinc oxide of size 60 nm;
  d. Nanosized interfacial material: alumina of size 50 nm.
  e. Nanosized surface energy-consuming material: titanium oxide of radium 10 nm.
2. Mixing Proportion:

a:b:c:d:e=23%:20%:22%:20%:15%

3. Technological Process:
Add the above modified nanosized materials as per the above sequence and proportion to mixer, thoroughly mix them at 150 rpm for 30 minutes and then take them out.

EXAMPLE 4

Preparation of Nanosized Filming Paste

1. Selection of Raw Materials
  f. Nanosized modified mixture 0.5%;
  g. Fluorocarbon filming substance perfluoro alkyl sulfuryl alkyl acrylate 5%;
  h. Functional aid: fatty alcohol polyoxyethylene ether, 0.1%;
  i. Dispersing medium: deionized water having conductivity below 0.1.
2. Mixing Proportion:

f:g:h:i=0.5%:5%:0.1%:94.4%

3. Preparation of Filming Paste:
Prepare raw materials at the above proportion, add functional aid to dispersing medium (deionized water), accelerate agitation to make functional aid evenly dissolved in dispersing medium, slowly add modified nanosized mixture of Example 3 to the above solution, mix the solution with agitator under 160 rpm for 30 minutes, evenly disperse the nanosized material in liquid phase for 10 minutes with emulsifying machine, disperse fluorocarbon filming substance and slowly add it to the dispersed nanosized liquid phase under slow agitation till even dissolving of the filming substance.

EXAMPLE 5

Preparation of Fabric Nanosized-Structure Film

Wash the to-be-filmed fibrous fabric, evenly spray the above paste on surface of the fabric twice, dry the paste-sprayed fabric in oven at 150° C. for 1 minute and obtain nanosized-structure filmed fabric.

EXAMPLE 6

Preparation of Nanosized-Structure Film on Glass Product Surface

Clean the glass product surface, adhere the nanosized filming paste onto glass product surface, take out the pasted glass product, dry it in oven at 120° C. for 5 minutes, take out it again and let it cool down.

EXAMPLE 7

Preparation of Nanosized-Structure Film on Vehicle Body Surface

Clean the vehicle body surface, evenly spray the nanosized filming paste onto vehicle body surface, and heat the said body in oven at 80° C. for 10 minutes.

EXAMPLE 8

Preparation of Nanosized-Structure Film on Brick, Stone and Wood Wall Surface

Clean the brick, stone and wood wall surface, evenly spray the above paste onto wall surface, and contact an infrared heating source (100° C.) with the wall surface for 5 minutes to obtain nanosized filmed wall surface.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:
1. A method of preparing a film of multi-phobic effects comprising:
  mixing fatty alcohol polyoxyethylene ether in water;
  providing a mixture of surface-modified nanoparticles including three or more types of surface-modified nanoparticles of less than about 100 nm in dimension, each type of surface-modified nanoparticles having a nanoparticle bound with a fluorocarbon surfactant;
  dispersing the mixture of surface-modified nanoparticles in the water, and
  adding perfluoro alkyl sulfuryl alkyl acrylate to form a colloid.

2. The method of claim 1 further comprising:
applying the colloid to a substrate; and
removing the water to form the film of multi-phobic effects.

3. The method of claim 2 wherein the film comprising a mixture of five types of surface-modified nanoparticles evenly dispersed in perfluoro alkyl sulfuryl alkyl acrylate, the mixture of five types of surface-modified nanoparticles including silica bound with a tetrafluoro-isophthalonitrile surfactant, titanium oxide bound with a fluorocarbon silane surfactant, zinc oxide bound with a perfluoro fluoro-silicone polymeric surfactant, alumina bound with a fluoroalkyl surfactant and titanium oxide bound with a fluoroalkyl surfactant.

* * * * *